United States Patent
Janik et al.

(10) Patent No.: US 10,959,299 B2
(45) Date of Patent: Mar. 23, 2021

(54) INDOOR LIGHTING CONTROL BASED ON OUTDOOR LIGHT

(71) Applicant: SIGNIFY HOLDING B.V., Eindhoven (NL)

(72) Inventors: Raymond George Janik, Fayetteville, GA (US); Russell Scott Trask, Sharpsburg, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/908,537

(22) Filed: Feb. 28, 2018

(65) Prior Publication Data

US 2019/0268990 A1    Aug. 29, 2019

(51) Int. Cl.
| H05B 33/08 | (2020.01) |
| H05B 45/10 | (2020.01) |
| H05B 45/20 | (2020.01) |
| H05B 47/11 | (2020.01) |

(52) U.S. Cl.
CPC ............ *H05B 45/10* (2020.01); *H05B 45/20* (2020.01); *H05B 47/11* (2020.01)

(58) Field of Classification Search
None
See application file for complete search history.

(56) References Cited

U.S. PATENT DOCUMENTS

| 7,777,166 | B2 * | 8/2010 | Roberts | G09F 9/3026 |
| | | | | 250/205 |
| 9,860,957 | B1 * | 1/2018 | Peterson | H05B 47/105 |
| 2010/0096993 | A1 * | 4/2010 | Ashdown | H05B 45/00 |
| | | | | 315/113 |
| 2014/0232292 | A1 * | 8/2014 | Adler | H05B 45/20 |
| | | | | 315/294 |

* cited by examiner

*Primary Examiner* — Amy Cohen Johnson
*Assistant Examiner* — Jianzi Chen (57) ABSTRACT

A lighting fixture includes a light source that emits an illumination light and a receiver configured to receive a lighting control message from a photo sensor device. The lighting fixture further includes a lighting controller configured to adjust the illumination light based on the lighting control message. Adjusting the illumination light by the lighting controller includes changing a Correlated Color Temperature (CCT) of the illumination light.

17 Claims, 5 Drawing Sheets

INDOOR LIGHTING CONTROL BASED ON OUTDOOR LIGHT

TECHNICAL FIELD

The present disclosure relates generally to lighting solutions, and more particularly to controlling indoor lighting based on outdoor light.

BACKGROUND

During daytime, indoor spaces are often illuminated independently of lighting conditions on the outside of the indoor spaces. For example, the light provided by an indoor lighting fixture is often the same regardless of the time of day. As another example, the light provided by an indoor lighting fixture is often the same regardless of the weather condition outdoors. Even when the intensity of the indoor light is adjusted, the correlated color temperature (CCT) may be left unchanged or may be changed independently of outdoor lighting conditions. However, the quality of the indoor light is generally at its highest if the CCT and the color quality (color rendering index (CRI)) of the indoor light matches or correlates with the CCT and CRI of the outdoor daylight. Further, CCT and light quality matching between indoor lighting and outdoor lighting may be beneficial in maintaining the Circadian Rhythm. For example, a warmer CCT is generally preferred as the outdoor light level is lower during morning and evening hours, and a cooler CCT may be generally preferred during daytime between the morning and evening hours. Thus, a solution that provides improved and adaptive indoor lighting may be desirable.

SUMMARY

The present disclosure relates generally to lighting solutions, and more particularly to controlling indoor lighting based on outdoor light. In an example embodiment, a lighting fixture includes a light source that emits an illumination light and a receiver configured to receive a lighting control message from a photo sensor device. The lighting fixture further includes a lighting controller configured to adjust the illumination light based on the lighting control message. Adjusting the illumination light by the lighting controller includes changing a Correlated Color Temperature (CCT) of the illumination light.

In another example embodiment, a photo sensor device includes a light sensor circuit configured to sense multiple components of an outdoor light that are in multiple ranges of wavelengths. The light sensor circuit is further configured to generate a lighting control message based on the multiple components of the outdoor light. The photo sensor device further includes a transmitter configured to transmit the lighting control message.

In another example embodiment, a lighting system includes a lighting fixture that emits an illumination light to illuminate an indoor space and a photo sensor device located to sense an outdoor light. The photo sensor device is configured to generate a lighting control message based on the outdoor light. The lighting fixture is configured to adjust a Correlated Color Temperature (CCT) of the illumination light based on the lighting control message.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Figure 1:
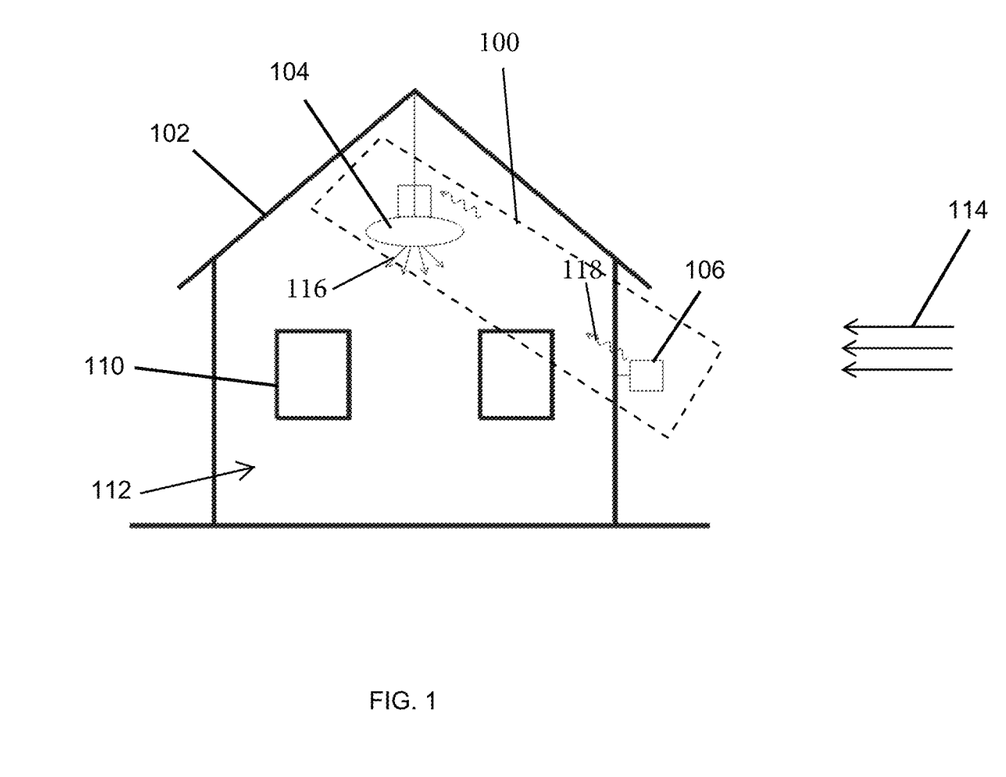
FIG. 1 illustrates a lighting system that adjusts an indoor light based on an outdoor light according to an example embodiment.

Turning now to the figures, particular example embodiments are described. FIG. 1 illustrates a lighting system 100 that adjusts an indoor light based on an outdoor light according to an example embodiment. In some example embodiments, the system 100 includes a lighting fixture 104 and a photo sensor device 106. The lighting fixture 104 may provide an illumination light 116 to an indoor space 112 inside a building 102 (e.g., a residential or office building) or a similar structure. For example, the indoor space 112 may be a room, a hallway, underground facility, etc. inside the building 102. The lighting fixture 104 may be a suspended lighting fixture, a recessed lighting fixture, or another type of lighting fixture. For example, the lighting fixture 104 may be suspended from or recessed in a ceiling of the building 102.

In some example embodiments, the building 102 may have one or more windows 110 through which outdoor light 114 from outside of the building enters the indoor space 112. The outdoor light 114 may be reflected off objects, such as trees, other buildings, terrain, etc. and surfaces that may contribute to the characteristics of the outdoor light 114. The indoor space 112 may be illuminated by the outdoor light 114 entering through the one or more windows and the illumination light 116 provided by the lighting fixture 104. In some alternative embodiments, the indoor space 112 may be fully or mostly devoid of outdoor light 114. For example, the indoor space 112 may be a room or a space that is too deep inside the building 102 to receive a meaningful amount of the outdoor light 114. As another example, the building 102 may not have the one or more windows 110.

In some example embodiments, the photo sensor device 106 may be located at least partially outside of the building 102 to sense the outdoor light 114. For example, the photo sensor device 106 may be attached to the building 102 or another structure that is outside of the building 102. Alternatively, the photo sensor device 106 may be located on the inside of the building 102 in a manner that allows the photo sensor device 106 to sense the outdoor light 114.

In some example embodiments, the photo sensor device 106 may sense the outdoor light 114 and generate one or more lighting control messages based on the outdoor light 114. The photo sensor device 106 may transmit the lighting control message to the lighting fixture 104 using one or more signals 118. For example, the photo sensor device 106 may wirelessly transmit one or more signals 118 that carry the lighting control message to the lighting fixture 104 wirelessly. Alternatively, the photo sensor device 106 may transmit the lighting control message to the lighting fixture 104 via a wired connection.

In some example embodiments, the lighting fixture 104 may receive the lighting control message and adjust the illumination light 116 based on the lighting control message. To illustrate, the lighting fixture 104 may set or adjust the CCT of the illumination light 116 based on the lighting control message. For example, the lighting fixture 104 may change the CCT of the illumination light to closely/substantially match a CCT of the outdoor light 114 sensed by the photo sensor device 106.

In some example embodiments, the lighting fixture 104 may set or adjust the CCT of the illumination light 116 based on one or more of the different types of information included in the lighting control message received from the photo sensor device 106. To illustrate, the lighting fixture 104 may set or adjust the CCT of the illumination light 116 based on the information in the lighting control message that indicates or corresponds to the light level of the outdoor light 114. For example, the lighting control message may include a value that indicates a light level of the outdoor light 114. A lower value may indicate a light level that is typically present during early morning or evening times, a higher value may indicate a light level that is typically present during day time between early morning and evening times, and a value that is below a particular threshold may indicate night time.

In some example embodiments, the lighting fixture 104 may set or adjust the CCT of the illumination light 116 based on the information in the lighting control message that indicates or corresponds to the blue light component of the outdoor light 114. To illustrate, the blue light component of the outdoor light 114 may correspond to a wavelength range (e.g., ~425 nm to ~500 nm) of the outdoor light 114. For example, the lighting control message may include a value that indicates or corresponds to the amplitude of the blue light component of the outdoor light 114.

In some example embodiments, the lighting fixture 104 may set or adjust the CCT of the illumination light 116 based on information that indicates or corresponds to other components of the outdoor light 114 instead of or in addition to the light level and/or the blue light component of the outdoor light 114. For example, the lighting control message may include information that indicates or corresponds to other types of information such as red light component and/or other components of the outdoor light 114. To illustrate, the lighting control message may include information that indicates or corresponds to the light level of the outdoor light 114, to the blue light component of the outdoor light 114, and/or to other information such red light component and/or green light component of the outdoor light 114.

Figure 5:
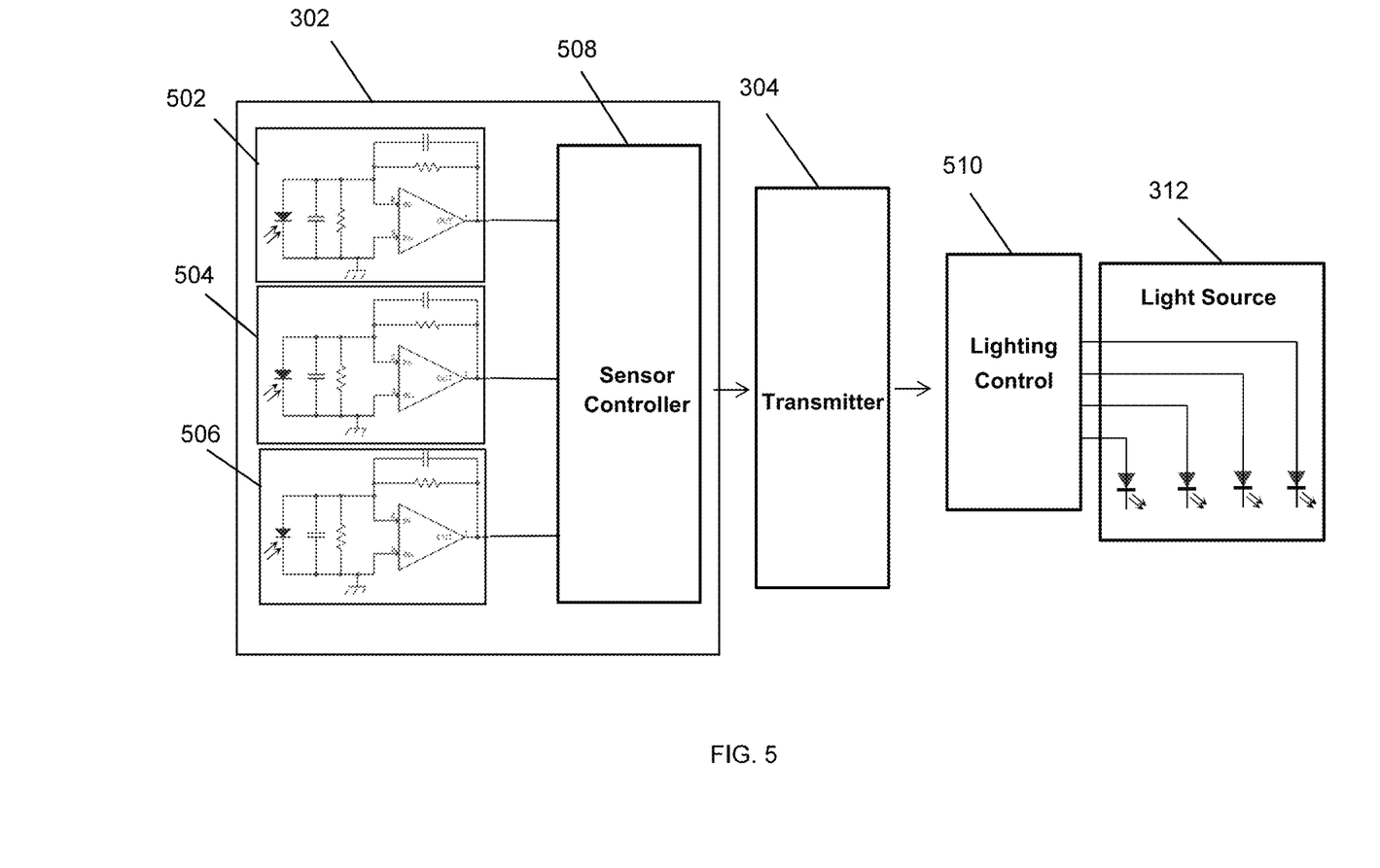
FIG. 5 illustrates details of the lighting system of FIG. 1 according to another example embodiment.

In some example embodiments, the lighting control message may include information that indicates or corresponds to one or more components of the outdoor light 114 with respect to one or more wavelength ranges as determined by the photo sensor device 106. Components of the outdoor light 114 with respect to different wavelength ranges are shown in FIG. 5 according to an example embodiment.

In some example embodiments, the lighting control message may include information that indicates a CCT value that the illumination light 116 should have. To illustrate, the lighting control message may include a value (e.g., a voltage value) that can be used by the lighting fixture 104 to set the CCT of the illumination light to a particular CCT value corresponding to the value included in the lighting control message.

In some example embodiments, the lighting fixture 104 may operate in a particular mode based on the lighting control message. For example, the lighting fixture 104 may operate in a daylight mode, in a low light mode, or in another mode depending on the information contained in the lighting control message. To illustrate, the lighting fixture 104 may operate in a particular mode based on one or more of a light level of the outdoor light 114, blue light component of the outdoor light 114, and/or other information that may be contained in the lighting control message indicating the outdoor lighting condition. For example, the lighting fixture 104 may operate in a daylight mode when the lighting control message indicates that the outdoor lighting condition corresponds to a daylight lighting condition that is typically present between early morning (e.g., between sunrise and 8 a.m.) and evening (e.g., between 5 p.m. and sunset) times. It is to be understood that typical early morning and evening times may vary based on location and/or season.

In the daylight mode, the lighting fixture 104 may operate such that the CCT of the illumination light 116 ranges between a first CCT value (e.g., ~4500K) and a second CCT value (e.g., ~6500K). For example, in the daylight mode, the lighting fixture 104 may adjust the CCT of the illumination light 116 between the first and second CCT values regardless of the dim level setting of the lighting fixture 104.

In some example embodiments, the lighting fixture 104 may operate in a low light mode when the lighting control message indicates that the outdoor lighting condition corresponds to a low lighting condition that is typically present during early morning (e.g., between sunrise and 8 a.m.) and evening (e.g., between 5 p.m. and sunset) times. For example, the lighting fixture 104 may operate in the low light mode if the lighting control message received from the photo sensor device 106 indicates a low light level, low blue light component, and/or relatively high red light component of the outdoor light 114.

In some example embodiments, in the low light mode, the lighting fixture 104 may set or adjust the CCT of the illumination light 116 based on the dim level setting of the lighting fixture 104. To illustrate, during the low light mode, the lighting fixture 104 may adjust the CCT of the illumination light 116 may set to a particular CCT value when the dim level of the illumination light 116 is set to threshold dim level. Alternatively or in addition, the lighting fixture 104 may adjust the CCT of the illumination light 116 in correlation with adjustments of the dim level setting of the lighting fixture 104. For example, the lighting fixture 104 may adjust the CCT of the illumination light 116 to different CCT values (e.g., 3000K, 2000K, 1000K, etc.) when the dim level of the illumination light 116 is adjusted to corresponding dim levels (e.g., 70%, 50%, 30%, etc.).

By adjusting the CCT of the illumination light 116 based on the outdoor lighting condition indicated by the lighting control message from the photo sensor device 106, the illumination light 116 may provide improved lighting inside the building 102. For example, the illumination light 116 may have improved quality by adjusting the CCT of the illumination light 116 to have a CCT that closely/substantially matches the CCT of the outdoor light 114. For example, the illumination light 116 may be adjusted based on the lighting control message to have a CCT that is with 100K of the CCT of the outdoor light 114. To illustrate, between early morning and evening times, the CCT of the illumination light 116 may be adjusted by the lighting fixture 104 to in a range of approximately 6400K to 6600K when the CCT of the outdoor light is approximately 6500K. As another example, the CCT of the illumination light 116 may be adjusted by the lighting fixture 104 to be in a range of approximately 4400K to 4600K when the CCT of the outdoor light is approximately 4500K. Further, during early morning and evening times, adjusting the CCT of the illumination light 116 in correlation with the dim level setting provides improved indoor lighting quality.

In some example embodiments, the photo sensor device 106 can also send other types of information that can be used to automate the building 102 in response to outdoor elements, such as sunshine, temperature, seasonal changes, humidity and/or moisture. For example, the temperature, humidity, etc. of the indoor space 112 may be adjusted based on corresponding information provided by the photo sensor device 106.

In some alternative embodiments, the system 100 may include multiple lighting fixtures that receive one or more lighting control messages from the photo sensor device 106. For example, different lighting fixtures that receive the one or more lighting control messages from the photo sensor device 106 may be in different parts of the building 102, such as in different rooms of the building 102. In some alternative embodiments, the lighting fixture 104 and the photo sensor device 106 may be at different locations than shown in FIG. 1 without departing from the scope of this disclosure.

Figure 2:
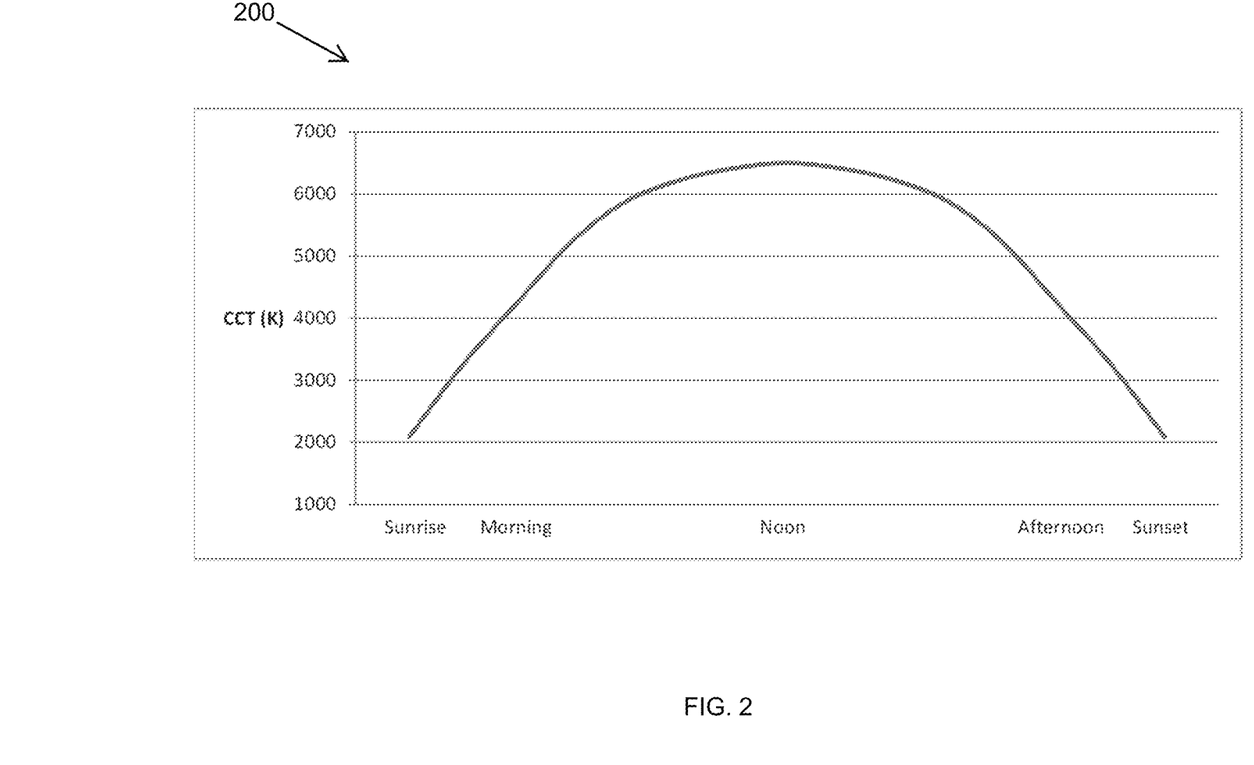
FIG. 2 illustrates a CCT value curve of an outdoor light with respect to different times of day according to an example embodiment.

FIG. 2 illustrates a CCT value curve 200 of the outdoor light 114 with respect to different times of day according to an example embodiment. Referring to FIGS. 1 and 2, in some cases, the CCT of the outdoor light 114 may be approximately 2000K at sunrise and may increase to approximately 4000K at the end of early morning (e.g., 8 a.m.). From the end of early morning, the CCT of the outdoor light 114 may increase up to approximately 6500K and decrease back to approximately 4000K by late afternoon (e.g., 5 p.m.). The CCT of the outdoor light 114 may continue to decrease down to approximately 2000K at sunset. It is to be understood that typical early morning and evening times may vary based on location, season, etc. It is also to be understood that the CCT of the outdoor light may depend on weather conditions and other factors such as air quality, etc.

Figure 3:
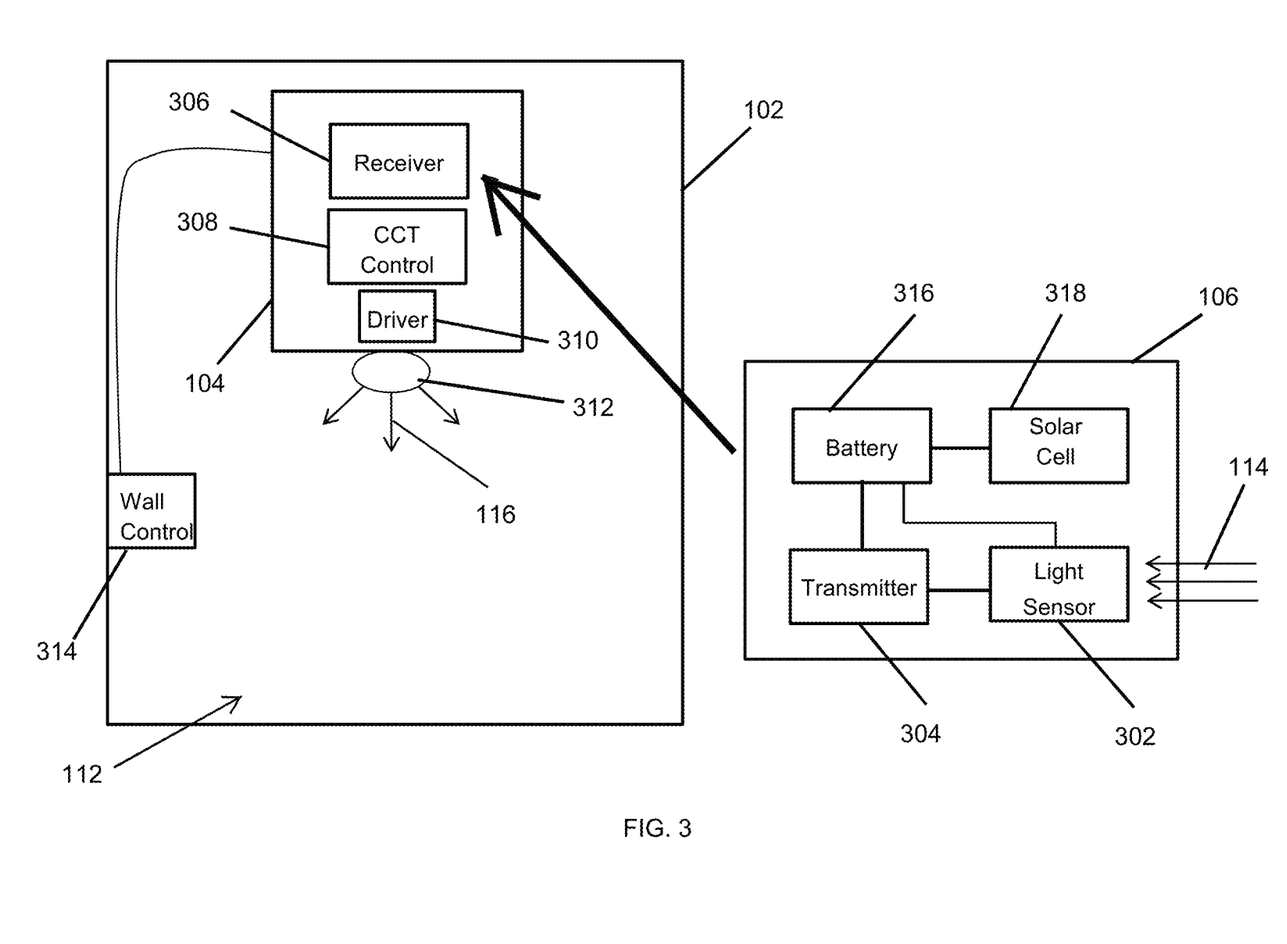
FIG. 3 illustrates details of the lighting system of FIG. 1 according to an example embodiment.

FIG. 3 illustrates details of the lighting system 100 of FIG. 1 according to an example embodiment. Referring to FIGS. 1-3, in some example embodiments, the photo sensor device 106 includes a light sensor circuit 302, a transmitter 304, a battery 316, and a photovoltaic cell/unit 318. The light sensor circuit 302 may sense the outdoor light 114 and generate the lighting control message described above. For example, the light sensor circuit 302 may sense one or more of the light level of the outdoor light 114, the blue light component of the outdoor light 114, the components of the outdoor light 114 in different wavelength ranges, etc. and generate the lighting control message based on the sensed information. The light sensor circuit 302 provides the lighting control message to the transmitter 304 that transmits the lighting control message wirelessly or via a wired connection.

Figure 4:
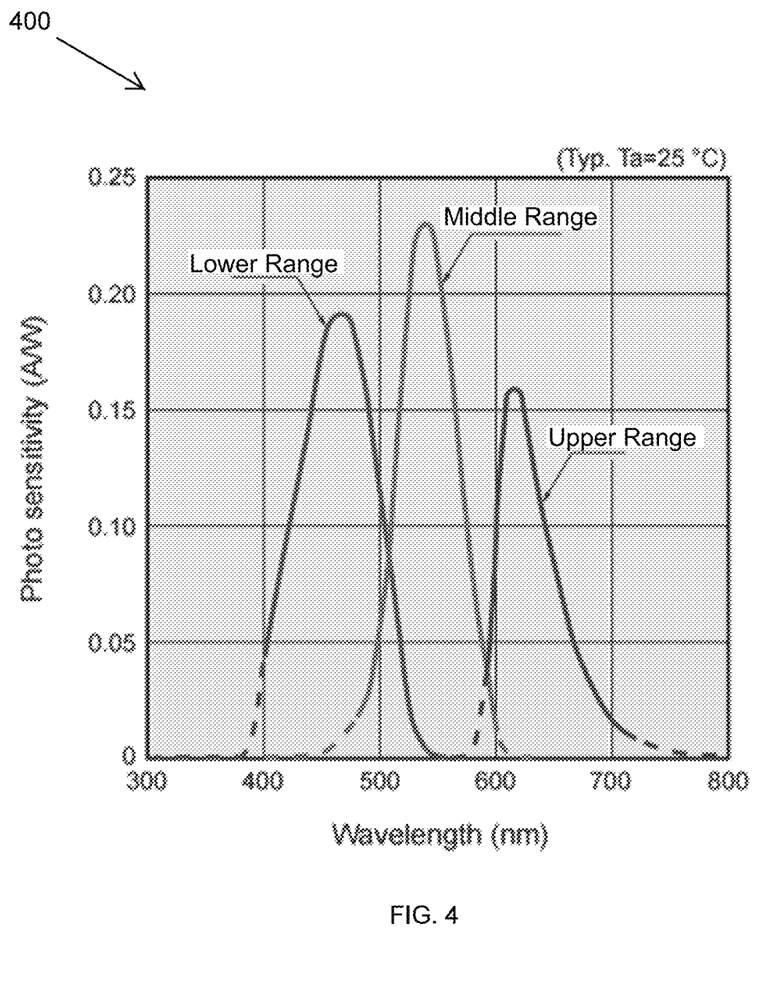
FIG. 4 illustrates different components of the outdoor light with respect to different ranges of wavelengths according to an example embodiment.

In some example embodiments, the light sensor circuit 302 senses one or more components of the outdoor light 114 that are in one or more ranges of wavelengths. To illustrate, a first component of the outdoor light 114 may be in a first range of wavelengths (e.g., ~425 nm to ~500 nm), and a second component of the outdoor light 114 may be in a second range of wavelengths (e.g., 600 nm to 650 nm). For example, different components of the outdoor light 114 with respect to different ranges of wavelengths are shown in FIG. 4 for a particular time of the day according to an example embodiment. Some of the ranges of wavelengths may be non-overlapping with each other, while other ranges of wavelengths may overlap. In FIG. 4, the lower range component may correspond to the blue light component of the outdoor light 114, the upper range component may correspond to the red light component of the outdoor light 114, and the middle range component may correspond to the green light component of the outdoor light 114. The light sensor circuit 302 may determine the amplitude of one or more of the different components corresponding to the one or more ranges of wavelengths and generate the lighting control message accordingly.

Referring to FIGS. 1-4, in some example embodiments, the battery 316 may provide electrical power to the transmitter 304 and to the light sensor circuit 302. For example, the photovoltaic cell 318 may convert solar energy into electrical power that is used to charge battery 316, which in turn can power the transmitter 304 and the light sensor circuit 302.

In some example embodiments, the lighting fixture 104 includes a receiver 306, a lighting controller 308, a driver 310, and a light source 312 such as a light emitting diode (LED) light source. For example, the driver 310 may be an LED driver. The light source 312 may include white LEDs and other phosphor converted color LEDs that together can produce the illumination light 116 that may be a full spectrum high quality light. For example, the illumination light 116 may be adjusted to closely match daylight.

In some example embodiments, the lighting controller 308 may control the illumination light 116 based on the dim level setting and the lighting control message from the photo sensor device 106. To illustrate, the lighting controller 308 may set/adjust the light level of the illumination light 116 based on the received dim level setting or command. For example, the receiver 306 or another component of the lighting fixture 104 may receive the dim level setting or command from a wall-mounted control device 314 (e.g., a wall dimmer, a wall station, etc.) or from another control device wirelessly or via a wired connection.

In some example embodiments, the lighting controller 308 may set/adjust the CCT of the illumination light 116 based on the lighting control message. For example, the receiver 306 may receive the lighting control message from the photo sensor device 106 and provide the lighting control message to the lighting controller 308. The lighting controller 308 may set/adjust the CCT of the illumination light 116 based on the information contained in the lighting control message in a manner described above. To illustrate, the lighting controller 308 may process the lighting control message to determine the information contained therein and control the CCT of the illumination light 116 accordingly.

For example, the lighting control message may indicate the CCT of the outdoor light 114, and the lighting controller 308 may process the lighting control message and change the CCT of the illumination light 116 to closely match the CCT of the outdoor light 114. As another example, the lighting control message may indicate the blue and/or other light components of the outdoor light 114, and the lighting controller 308 may process the lighting control message and adjust the illumination light 116 to have similar blue and/or other components that can result in the CCT of the illumination light 116 closely matching the CCT of the outdoor light 114. As another example, the lighting control message may indicate the component of the outdoor light 114 in one or more wavelength ranges, and the lighting controller 308 may process the lighting control message and adjust the illumination light 116 to have a similar component that can result in the CCT of the illumination light 116 closely matching the CCT of the outdoor light 114.

In some example embodiments, the lighting control message may indicate the light level of the outdoor light 114, and lighting controller 308 may operate the lighting fixture 104 in a daylight mode, in a low light mode, or in another mode depending on the light level indicated by the lighting control message. Alternatively or in addition, the controller 308 may use other information, such as the blue light component of the outdoor light 114 indicated by the lighting control message, to determine whether to operate the lighting fixture 104 in a particular mode. In some example embodiments, the lighting controller 308 may include hardware (e.g., a CPU, a memory device, etc.), a software code, or a combination of thereof to perform its operations.

In some alternative embodiments, the receiver 306 and the lighting controller 308 may be integrated into a single component or into the driver 310 without departing from the scope of this disclosure. In some example embodiments, the wall-mounted control device 314 may be omitted without departing from the scope of this disclosure. In some alternative embodiments, one or more components (e.g., the solar cell 318) of the photo sensor device 106 may be omitted or integrated into a single component.

FIG. 5 illustrates details of the lighting system 100 of FIG. 1 according to another example embodiment. Referring to FIGS. 1-5, in some example embodiments, the light sensor circuit 302 may include light sensor elements 502, 504, 506 that can sense different components of the outdoor light 114. For example, the light sensor element 502 may sense the component of the outdoor light 114 in the lower range shown in FIG. 4, the light sensor element 504 may sense the component of the outdoor light 114 in the middle range, and the light sensor element 506 may sense the component of the outdoor light 114 in the upper range. That is, each light sensor element 502, 504, 506 may have a photosensitivity that corresponds to a particular range of wavelengths of the outdoor light 114. The light sensor elements 502, 504, 506 may each output one or more electrical signals based on the sensing of the respective component of the outdoor light 114.

In some example embodiments, the light sensor circuit 302 may also include a sensor controller 508 that can process electrical signals from the light sensor elements 502, 504, 506 and generate the lighting control message described above. For example, the sensor controller 508 may generate the lighting control message that includes information (e.g., one or more values) indicating one or more of the CCT of the outdoor light 114, a light level of the outdoor light 114, a particular component (e.g., blue component amount) of the outdoor light 114, etc. The sensor controller 508 may include hardware (e.g., a CPU, a memory device, etc.), a software code, or a combination thereof to perform its operations.

In some example embodiments, the transmitter 304 may receive the lighting control message from the sensor controller 508 and transmit the lighting control message wirelessly or via a wired connection. The transmitter 304 may transmit the lighting control message in compliance with a communication standard such as Wi-Fi and Ethernet standards.

In some example embodiments, the lighting fixture 104 may include and may be in communication with a lighting control circuit 510 that receives the lighting control message transmitted by the transmitter 304. For example, the lighting control circuit 510 may include the receiver 306, the lighting controller 308, and the driver 310 more clearly shown in FIG. 3 and may perform the operations described above with respect to the components. The lighting control circuit 510 may receive and process the lighting control message and adjust the CCT of the illumination light 116 based on the information contained in the lighting control message as described above. As described above, the CCT of the illumination light 116 may be adjusted based on the lighting control message to closely match the CCT of the outdoor light 114. For example, the lighting control circuit 510 may control the amount of power provided to the different LED branches of the light source 312, where, for example, different LED branches emit lights dominated by a respective CCT such that the combination of the lights has a desired CCT. The CCT of the illumination light 116 may be adjusted periodically or continuously to maintain the CCT of the illumination light 116 in close match with the CCT of the outdoor light 114.

In some example embodiments, the CCT of the illumination light 116 may be limited within a range of CCT values (e.g., 4500K-6500K) during the daylight mode described above. In some example embodiments, the CCT of the illumination light 116 may also be limited to below a particular CCT (e.g., 3000K) during the low light mode described above.

By providing indoor lighting that has a CCT that closely matches the CCT of the outdoor light, improved color perception may be achieved in indoor environments. The close matching of the CCT of the illumination light 116 to the CCT of the outdoor light 114 may also help maintain the Circadian Rhythm of occupants of the indoor space 112. During low outdoor light conditions, such early morning and evening hours, the adjustment of the CCT of the illumination light 116 based on the dim level setting enables the gradual introduction and removal of the blue light by gradually increasing and decreasing the CCT of the illumination light 116 in correlation with the adjustment of the dim level.

In some alternative embodiments, the light sensor circuit 302 may include more or fewer light sensor elements than shown in FIG. 5 without departing from the scope of this disclosure. In some alternative embodiments, one or more components of the light sensor circuit 302 and/or the transmitter 304 may be combined without departing from the scope of this disclosure. In some alternative embodiments, the light source 312 may include more or fewer LED branches than shown without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. An indoor lighting fixture, comprising:
a light source that emits an illumination light;
a receiver configured to receive a lighting control message from a remote photo sensor device, wherein the lighting control message indicates a level of a single wavelength component of an outdoor light, wherein the single wavelength component of the outdoor light is sensed separately by the remote photo sensor device from among multiple wavelength components of the outdoor light that are in different ranges of wavelengths of the outdoor light; and
a lighting controller configured to adjust the illumination light provided by the light source, wherein, when operating in a daylight mode, the lighting controller is configured to adjust the illumination light based on the level of the single wavelength component of the outdoor light and independent of a dim level setting of the lighting fixture such that the illumination light is unaffected by the dim level setting during operations in the daylight mode, wherein, when operating in a low light mode, the lighting controller is configured to adjust the illumination light based on the dim level setting of the lighting fixture provided to the lighting fixture and independent of the level of the single wavelength component such that the illumination light is unaffected by the level of the single wavelength component during operations in the low light mode, wherein whether the lighting controller operates in the daylight mode or in the low light mode is determined based on the level of the single wavelength component, and wherein adjusting the illumination light by the lighting controller includes changing a Correlated Color Temperature (CCT) of the illumination light to correlate to a CCT of the outdoor light.

2. The indoor lighting fixture of claim 1, wherein the lighting controller is configured to adjust the illumination light based on the lighting control message by changing the CCT of the illumination light to substantially match a CCT of the outdoor light sensed by the remote photo sensor device.

3. The indoor lighting fixture of claim 1, wherein the indoor lighting fixture is configured to operate in the daylight mode when an outdoor lighting condition corresponds to a daylight lighting condition that is present between early morning and evening times, wherein the CCT of the illumination light ranges between a first CCT value and a second CCT value during the daylight mode.

4. The indoor lighting fixture of claim 3, wherein the first CCT value is approximately 4500K and wherein the second CCT value is approximately 6500K.

5. The indoor lighting fixture of claim 3, wherein the CCT of the illumination light is changed below a third CCT value that is less than the first CCT value and the second CCT value.

6. The indoor lighting fixture of claim 5, wherein the third CCT is approximately 3000K in the low light mode.

7. The indoor lighting fixture of claim 1, wherein the single wavelength component of the outdoor light corresponds to a blue light wavelength component of the outdoor light.

8. The indoor lighting fixture of claim 1, wherein the single wavelength component of the outdoor light corresponds to a red light wavelength component of the outdoor light.

9. The indoor lighting fixture of claim 1, wherein the receiver is configured to receive the lighting control message from the remote photo sensor device wirelessly.

10. A lighting system, comprising:
an indoor lighting fixture that emits an illumination light to illuminate an indoor space; and
a remote photo sensor device located to sense one or more wavelength components of an outdoor light from among one or more wavelength components of the outdoor light, wherein the remote photo sensor device is configured to generate a lighting control message based on a single wavelength component of the one or more wavelength components of the outdoor light, wherein the single wavelength component of the one or more wavelength components of the outdoor light corresponds to a single color component of the outdoor light, and wherein, when operating in a daylight mode, the indoor lighting fixture is configured to adjust a Correlated Color Temperature (CCT) of the illumination light to correlate to a CCT of the outdoor light based on the lighting control message received from the remote photo sensor device and independent of a dim level setting of the lighting fixture such that the illumination light is unaffected by the dim level setting during operations in the daylight mode, wherein, when operating in a low light mode, the indoor lighting fixture is configured to adjust the CCT of the illumination light based on the dim level setting of the lighting fixture provided to the lighting fixture and independent of the level of the lighting control message such that the illumination light is unaffected by the lighting control message during operations in the low light mode, and wherein whether the lighting fixture operates in the daylight mode or in the low light mode is determined based on the lighting control message.

11. The lighting system of claim 10, wherein the indoor lighting fixture is configured to adjust the illumination light based on the lighting control message such that the CCT of the illumination light substantially matches a CCT of the outdoor light.

12. The lighting system of claim 10, wherein the remote photo sensor device is configured to sense the one or more wavelength components of the outdoor light that are in one or more different ranges of wavelengths of the outdoor light.

13. The lighting system of claim 10, wherein the remote photo sensor device comprises:
a first photo sensor element configured to sense the single wavelength component of the one or more wavelength components of the outdoor light that is in a first range of wavelengths; and
a second photo sensor element configured to sense a second wavelength component of the one or more wavelength components of the outdoor light that is in a second range of wavelengths.

14. The lighting system of claim 10, wherein the indoor lighting fixture comprises a lighting controller configured to adjust the illumination light based on the lighting control message.

15. The lighting system of claim 10, wherein the remote photo sensor device further comprises a transmitter that wirelessly transmits the lighting control message to the indoor lighting fixture.

16. The lighting system of claim 10, wherein the single wavelength component of the one or more wavelength components of the outdoor light corresponds to a blue light wavelength component of the outdoor light.

17. The lighting system of claim 10, wherein the single wavelength component of the one or more wavelength components of the outdoor light corresponds to a red light wavelength component of the outdoor light.

* * * * *